UNITED STATES PATENT OFFICE.

WILLIAM SCHÖNING, OF CHRISTIANIA, NORWAY.

PROCESS OF PRESERVING EGGS.

SPECIFICATION forming part of Letters Patent No. 709,583, dated September 23, 1902.

Application filed May 23, 1901. Serial No. 61,639. (No specimens.)

*To all whom it may concern:*

Be it known that I, WILLIAM SCHÖNING, a subject of the King of Sweden and Norway, residing at Christiania, Norway, have invented a new and useful Improved Process of Preserving Eggs, of which the following is a description.

The present invention consists of a process for preserving eggs.

In order to attain the object in view according to the present invention the fresh eggs are first laid in hot water (not boiling water) for a few seconds. Immediately after they have been removed from the warm water they are placed in a solution of cold salt water, sal-ammoniac, and silicate of soda and allowed to remain in the same until they have become quite cold. The proportions of the solution are advantageously eighty parts, by weight, of cold salt water, ten parts of sal-ammoniac, and ten parts of silicate of soda. The result of this treatment is that the hot water or steam sterilizes the contents of the egg without, however, imparting to them the taste or appearance of a boiled egg. The skin within the shell of the egg is also thoroughly sterilized and rendered stronger, so that it will be more impervious to the outer air. During the heating or warming process the pores of the egg are opened, while the cold solution mentioned immediately sets in the pores and provides a coating over the shell, which renders it also impervious to the influences of the atmosphere. This treatment has the effect of forming a thin coating over the shell of the egg, which closes up all the pores of the same, preventing the atmospheric air from penetrating the shell. Eggs treated in this manner will keep fresh for any length of time.

If the eggs are intended for export to countries having a hot climate, it is advantageous to allow them to remain somewhat longer in the warm water before they are placed in the solution as above described.

I claim as my invention—

Process for preserving eggs, which consists in first warming the fresh eggs in warm water for a few seconds and then immediately they are removed from the warm water, allowing them to cool in a solution of cold salt water, sal-ammoniac, and silicate of soda, in the manner and for the purpose substantially as described.

In witness whereof I have hereunto set my hand in presence of two witnesses.

WM. SCHÖNING.

Witnesses:
  M. ALGER,
  Z. BREHH.